US009304215B2

(12) United States Patent
Stork

(10) Patent No.: US 9,304,215 B2
(45) Date of Patent: Apr. 5, 2016

(54) RECEIVING SEISMIC SIGNALS FROM SEISMIC SIGNAL SOURCES

(75) Inventor: Christof Stork, Denver, CO (US)

(73) Assignee: Landmark Graphics Corporation, Houston, TX (US)

( * ) Notice: Subject to any disclaimer, the term of this patent is extended or adjusted under 35 U.S.C. 154(b) by 1016 days.

(21) Appl. No.: 13/341,424

(22) Filed: Dec. 30, 2011

(65) Prior Publication Data

US 2013/0170317 A1    Jul. 4, 2013

(51) Int. Cl.
  *G01V 1/00* (2006.01)
  *G01V 1/28* (2006.01)
  *G01V 1/38* (2006.01)

(52) U.S. Cl.
  CPC . *G01V 1/003* (2013.01); *G01V 1/28* (2013.01); *G01V 1/3808* (2013.01)

(58) Field of Classification Search
  CPC ........ G01V 1/003; G01V 1/28; G01V 1/3808
  USPC .......................... 367/56, 58; 702/14; 181/112
  See application file for complete search history.

(56) References Cited

U.S. PATENT DOCUMENTS

| | | | |
|---|---|---|---|
| 4,172,226 A | | 10/1979 | Rubin |
| 4,930,110 A | * | 5/1990 | Bremner et al. ............... 367/56 |
| 4,933,912 A | * | 6/1990 | Gallagher ..................... 367/59 |
| 4,964,103 A | | 10/1990 | Johnson |
| 5,430,689 A | * | 7/1995 | Rigsby et al. .................. 367/15 |
| 5,487,052 A | * | 1/1996 | Cordsen ........................ 367/56 |
| 5,905,657 A | | 5/1999 | Celniker |
| 6,028,822 A | | 2/2000 | Lansley et al. |
| 6,590,831 B1 | | 7/2003 | Bennett et al. |
| 6,922,373 B2 | | 7/2005 | Armstrong |
| 6,965,849 B1 | | 11/2005 | Cao et al. |
| 7,512,034 B2 | | 3/2009 | Haldorsen |
| 7,689,396 B2 | | 3/2010 | Campbell |

(Continued)

FOREIGN PATENT DOCUMENTS

WO    WO 2004/036254    4/2004

OTHER PUBLICATIONS

Umwelt (Australia) Pty Limited, "Review of Environmental Factors for Caroona Exploration Program—EL6505 3D Seismic Survey 2010" Oct. 20, 2010 (122 pages).

(Continued)

*Primary Examiner* — Luke Ratcliffe
*Assistant Examiner* — Hovhannes Baghdasaryan
(74) *Attorney, Agent, or Firm* — John W. Wustenberg; Fish & Richardson P.C.

(57) ABSTRACT

A seismic exploration system includes a survey area defined by a perimeter and including a first plurality of sub-areas and a second plurality of sub-areas adjacent the first plurality of sub-areas; two or more seismic energy sources installed within the perimeter of the seismic survey area; a first plurality of groups of seismic energy receivers installed in the first plurality of sub-areas, each of the groups of seismic energy receivers in the first plurality of groups including two or more seismic energy receivers per wavelength of seismic energy generated by the two or more seismic energy sources; and a second plurality of groups of seismic energy receivers installed in the second plurality of sub-areas, each of the groups of seismic energy receivers in the second plurality of groups including less than two seismic energy receivers per wavelength of seismic energy generated by the two or more seismic energy sources.

19 Claims, 7 Drawing Sheets

(56) References Cited

U.S. PATENT DOCUMENTS

| | | | |
|---|---|---|---|
| 8,068,384 B2* | 11/2011 | Saenger et al. | 367/38 |
| 2002/0060952 A1 | 5/2002 | Cecconi et al. | |
| 2006/0085133 A1 | 4/2006 | Young et al. | |
| 2008/0080312 A1* | 4/2008 | Eperjesi et al. | 367/79 |
| 2009/0185448 A1* | 7/2009 | Duncan et al. | 367/40 |
| 2010/0171501 A1 | 7/2010 | Alumbaugh et al. | |
| 2010/0195439 A1* | 8/2010 | Muyzert | 367/56 |

OTHER PUBLICATIONS

Douglas J. Morrice et al., "Optimizing Operations in 3-D Land Seismic Surveys" http://geophysics.geoscienceworld.org/cgi/content/abstract/66/6/1818, May 3, 2011 (2 pages).

Dale G. Stone, "Designing Seismic Surveys in Two and Three Dimensions," Society of Exploration Geophysicists, 1994 (6 pages including cover and copyright page).

Gary A. Crews et al., "An Economical High-Resolution 3-D Seismic Survey Technique," Extended Abstracts, 61st Annual International Meeting, Society of Exploration Geophysicists, 90, 863-866 (1991) (3 pages).

Andreas Cordsen et al., "Narrow- versus wide-azimuth land 3D seismic surveys," The Leading Edge, Aug. 2002 (6 pages).

Mike Galbraith, "A new methodology for 3D survey design," The Leading Edge, Oct. 2004 (7 pages).

Notification of Transmittal of the International Search Report and the Written Opinion of the International Searching Authority, or Declaration (1 page); International Search Report (2 pages); and Written Opinion of the International Searching Authority (6 pages), mailed Nov. 27, 2012, for related international application PCT/US2012/054632.

Authorized Officer Agnes Wittmann-Regis, PCT International Preliminary Report on Patentability, PCT/US2012/054632, Jul. 10, 2014, 7 pages.

* cited by examiner

RECEIVING SEISMIC SIGNALS FROM SEISMIC SIGNAL SOURCES

TECHNICAL BACKGROUND

This disclosure relates to receiving seismic signals (e.g., seismic energy) reflected from one or more geologic formations in a subterranean zone.

BACKGROUND

In many instances, seismic reflection is used for exploring geophysics by using principles of seismology to estimate the characteristics of the Earth's subsurface from reflected seismic waves. Similar to sonar and echolocation technologies, this method uses a controlled seismic source of energy (such as a seismic vibrator) and a receiving/detection system to sense, compute, and analyze gathered signal. Seismic exploration aims to generate visual representations of subterranean geological formations. A modern seismic exploration system may include a seismic energy source and an array of receivers for data acquisition, a computation system for data recording, result generation and numerical simulation, and a visualization facility for result interpretation. Depending on the arrangement of the seismic energy source and the array of sensors, different levels of noise may be gathered and negatively affecting the quality and confidence of the signal to be processed and interpreted.

Some conventional techniques for seismic exploration may include installing a number of seismic energy sources at a terranean surface in a first set of parallel rows and installing a number of seismic energy receivers at the terranean surface in a second set of parallel rows that are orthogonal to the first set. Other conventional techniques may include installing a number of seismic energy sources to form a grid with multiple square areas defined within four sources at the corners of the areas. Seismic energy receivers may then be installed within each of the square areas in densely-packed arrays.

DETAILED DESCRIPTION

Figure 1:
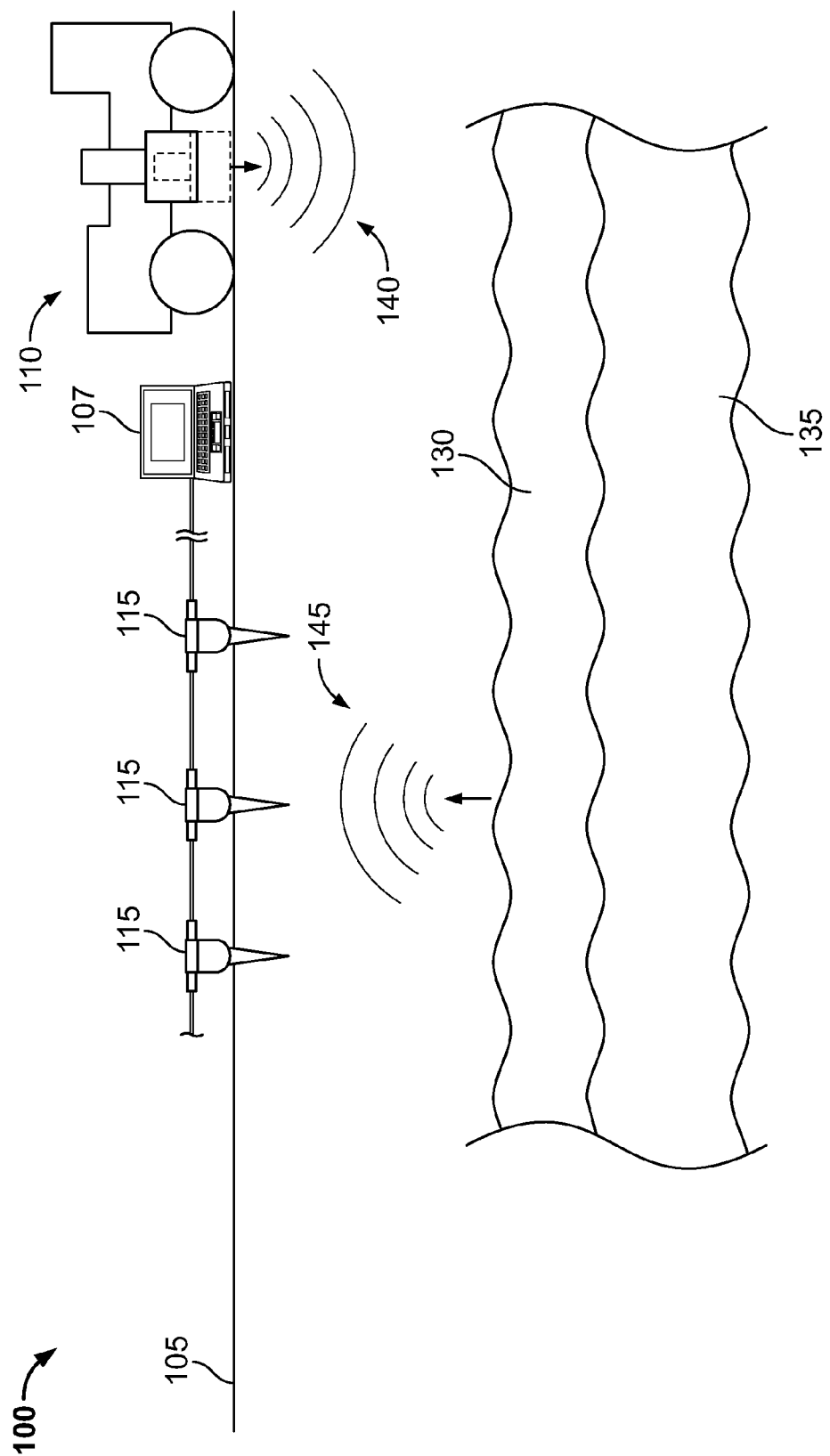
FIG. 1 illustrates an example system for collecting seismic energy generated by one or more seismic energy sources reflected from one or more geologic formations to seismic energy receivers.

The present disclosure describes techniques for receiving seismic signals (e.g., seismic energy) reflected from one or more geologic formations in a subterranean zone. In a first general embodiment, a system for receiving seismic signals includes a first plurality of seismic signal sources installed at a terranean surface grouped to define respective perimeters of a first plurality of geographic zones on the terranean surface; a second plurality of seismic signal sources installed at the terranean surface grouped to define respective perimeters of a second plurality of geographic zones on the terranean surface, one of the first plurality of geographic zones adjacent one of the second plurality of geographic zones; and a plurality of seismic signal receivers installed at the terranean surface within the first and second plurality of geographic zones, the installed seismic signal receivers within the first plurality of geographic zones are less than the installed seismic signal receivers within the second plurality of geographic zones.

In a first aspect combinable with the first general embodiment, the installed seismic signal receivers within the first plurality of geographic zones are fewer than half of the installed seismic signal receivers within the second plurality of geographic zones.

In a second aspect combinable with any of the previous aspects, the installed seismic signal receivers within the first plurality of geographic zones include less than two seismic signal receivers per wavelength of seismic energy generated by at least one of the seismic signal sources.

In a third aspect combinable with any of the previous aspects, the installed seismic signal receivers within the second plurality of geographic zones include two or more seismic signal receivers per wavelength of seismic energy generated by at least one of the seismic signal sources.

In a fourth aspect combinable with any of the previous aspects, the first plurality of geographic zones are substantially free of seismic signal receivers.

In a fifth aspect combinable with any of the previous aspects, the plurality of the installed seismic signal receivers within the second plurality of geographic zones include an array of seismic signal receivers spaced substantially uniformly within respective geographic zones of the second plurality of geographic zones.

In a sixth aspect combinable with any of the previous aspects, each geographic zone in the first and second plurality of geographic zones is of substantially the same area.

In a seventh aspect combinable with any of the previous aspects, the perimeters of the first and second plurality of geographic zones are substantially square.

In an eighth aspect combinable with any of the previous aspects, a group of seismic signal sources in the second plurality of seismic signal sources includes four seismic signal sources, and each of the four seismic signal sources is spaced at least approximately 300 meters from the other of the four seismic signal sources in the group.

In a ninth aspect combinable with any of the previous aspects, the groups of seismic signal sources in the second plurality of seismic signal sources include a first group and a second group, the respective geographic zones defined by the first and second groups of seismic signal sources in the second plurality of seismic signal sources are separated by at least one of the geographic zones of the plurality of first geographic zones.

In a tenth aspect combinable with any of the previous aspects, the installed seismic signal receivers within the second plurality of geographic zones include approximately 225 seismic signal receivers, and each of the 225 seismic signal receivers is spaced at least approximately 20 meters from the other seismic signal receivers in the group.

In an eleventh aspect combinable with any of the previous aspects, the terranean surface includes a subsea terranean surface.

In a second general embodiment, a method for receiving seismic signals includes: installing a first plurality of seismic signal sources at a terranean surface grouped to define respective perimeters of a first plurality of geographic zones on the terranean surface; installing a second plurality of seismic signal sources at the terranean surface grouped to define respective perimeters of a second plurality of geographic zones on the terranean surface, one of the first plurality of geographic zones adjacent one of the second plurality of geographic zones; installing a plurality of seismic signal receivers at the terranean surface within the first plurality of geographic zones; and installing a plurality of seismic signal receivers at the terranean surface within the second plurality of geographic zones, the installed seismic signal receivers within the first plurality of geographic zones are less than the installed seismic signal receivers within the second plurality of geographic zones.

In a first aspect combinable with the second general embodiment, the installed seismic signal receivers within the first plurality of geographic zones are fewer than half of the installed seismic signal receivers within the second plurality of geographic zones.

In a second aspect combinable with any of the previous aspects, the installed seismic signal receivers within the first plurality of geographic zones include less than two seismic signal receivers per wavelength of seismic energy generated by at least one of the seismic signal sources.

In a third aspect combinable with any of the previous aspects, the installed seismic signal receivers within the second plurality of geographic zones include two or more seismic signal receivers per wavelength of seismic energy generated by at least one of the seismic signal sources.

In a fourth aspect combinable with any of the previous aspects, installing a plurality of seismic signal receivers at the terranean surface within the first plurality of geographic zones includes installing no seismic signal receivers within the first plurality of geographic zones.

A fifth aspect combinable with any of the previous aspects includes spacing the installed seismic signal receivers substantially uniformly within respective geographic zones of the second plurality of geographic zones.

In a sixth aspect combinable with any of the previous aspects, installing a second plurality of seismic signal sources at the terranean surface includes installing a group of four seismic signal sources at corners of a particular geographic zone of the second plurality of geographic zones, the particular geographic zone of the second plurality of geographic zones including a substantially square area.

A seventh aspect combinable with any of the previous aspects includes installing a group of two seismic signal sources adjacent a corresponding two of the four seismic signal sources to form a particular geographic zone of the first plurality of geographic zones adjacent the particular geographic zone of the second plurality of geographic zones.

In an eighth aspect combinable with any of the previous aspects, the particular geographic zone of the first plurality of geographic zones including a substantially square area that shares a perimeter portion with the particular geographic zone of the second plurality of geographic zones.

A ninth aspect combinable with any of the previous aspects includes generating seismic energy by at least some of the seismic signal sources in the first and second plurality of seismic signal sources.

In a tenth aspect combinable with any of the previous aspects includes receiving, at the installed seismic signal receivers within the second plurality of geographic zones, the generated seismic energy reflected from a geologic formation in a subterranean zone.

In an eleventh aspect combinable with any of the previous aspects includes generating an image of an unaliased form of the received seismic energy.

In a twelfth aspect combinable with any of the previous aspects, generating an image of an unaliased form of the received seismic energy includes generating a three-dimensional image of an unaliased form of the received seismic energy, the three dimensions including a depth below the terranean surface, a first axis across a particular geographic zone of the second plurality of geographic zones, and a second axis across the particular geographic zone of the second plurality of geographic zones that is substantially orthogonal to the first axis.

In a thirteenth aspect combinable with any of the previous aspects includes filtering the received seismic energy to remove seismic noise generated within a surface layer.

In a third general embodiment, a seismic exploration system includes a plurality of seismic energy sources installed at a terranean surface to form a grid of seismic energy sources defining a plurality of geographic zones, each geographic zone having three or more vertices corresponding to installed seismic energy sources and three or more sides with each side defined between installed seismic energy sources; and a plurality of seismic energy receivers installed at the terranean surface within non-adjacent geographic zones of the grid.

A first aspect combinable with the third general embodiment includes a second plurality of seismic energy receivers installed at the terranean surface within geographic zones next to the non-adjacent geographic zones of the grid.

In a second aspect combinable with any of the previous aspects, the second plurality of seismic energy receivers is less than the plurality of seismic energy receivers installed at the terranean surface within the non-adjacent geographic zones of the grid.

In a third aspect combinable with any of the previous aspects, the second plurality of seismic energy receivers is less than half of the plurality of seismic energy receivers installed at the terranean surface within the non-adjacent geographic zones of the grid.

In a fourth aspect combinable with any of the previous aspects, the second plurality of seismic energy receivers includes less than two seismic energy receivers per wavelength of seismic energy generated by at least one of the plurality of seismic energy sources.

In a fifth aspect combinable with any of the previous aspects, the plurality of seismic energy receivers installed at the terranean surface within the non-adjacent geographic zones of the grid includes two or more seismic energy receivers per wavelength of seismic energy generated by at least one of the plurality of seismic energy sources.

In a sixth aspect combinable with any of the previous aspects, the plurality of seismic energy receivers installed at the terranean surface within the non-adjacent geographic zones of the grid include seismic geophones.

In a seventh aspect combinable with any of the previous aspects, the seismic geophones are communicably coupled within an array.

In a fourth general embodiment, a seismic exploration system includes a seismic survey area on a terranean surface defined by a perimeter and including a first plurality of sub-areas and a second plurality of sub-areas adjacent the first plurality of sub-areas; two or more seismic energy sources installed at the terranean surface within the perimeter of the seismic survey area; a first plurality of groups of seismic energy receivers installed at the terranean surface in the first plurality of sub-areas, each of the groups of seismic energy receivers in the first plurality of groups including two or more seismic energy receivers per wavelength of seismic energy generated by the two or more seismic energy sources; and a second plurality of groups of seismic energy receivers installed at the terranean surface in the second plurality of sub-areas, each of the groups of seismic energy receivers in the second plurality of groups including less than two seismic energy receivers per wavelength of seismic energy generated by the two or more seismic energy sources.

In a first aspect combinable with the fourth general embodiment, the second plurality of sub-areas are substantially free of seismic energy receivers.

In a second aspect combinable with any of the previous aspects, the two or more seismic energy receivers are installed at the terranean surface in random placement within the perimeter of the seismic survey area.

In a third aspect combinable with any of the previous aspects, the first plurality of groups of seismic energy receivers installed at the terranean surface in the first plurality of sub-areas include groups of seismic energy receivers arbitrarily installed at the terranean surface in the first plurality of sub-areas.

In a fifth general embodiment, a method for receiving seismic signals includes: defining, within a perimeter, a seismic survey area on a terranean surface, the seismic survey area including a first plurality of sub-areas and a second plurality of sub-areas adjacent the first plurality of sub-areas; installing two or more seismic energy sources at the terranean surface within the perimeter of the seismic survey area; installing a first plurality of groups of seismic energy receivers at the terranean surface in the first plurality of sub-areas, each of the groups of seismic energy receivers in the first plurality of groups including two or more seismic energy receivers per wavelength of seismic energy generated by the two or more seismic energy sources; and installing a second plurality of groups of seismic energy receivers at the terranean surface in the second plurality of sub-areas, each of the groups of seismic energy receivers in the second plurality of groups including less than two seismic energy receivers per wavelength of seismic energy generated by the two or more seismic energy sources.

In a first aspect combinable with the fifth general embodiment, the second plurality of sub-areas are substantially free of seismic energy receivers.

In a second aspect combinable with any of the previous aspects, installing two or more seismic energy sources at the terranean surface within the perimeter of the seismic survey area includes installing two or more seismic energy sources at the terranean surface in random placement within the perimeter of the seismic survey area.

In a third aspect combinable with any of the previous aspects, installing a first plurality of groups of seismic energy receivers at the terranean surface in the first plurality of sub-areas includes arbitrarily installing a first plurality of groups of seismic energy receivers at the terranean surface in the first plurality of sub-areas.

One or more embodiments of a seismic energy system according to the present disclosure may include one or more of the following features. For example, the seismic energy system may include a geometry for layout of sources and receivers in land surface seismic acquisition that reduces the impact of noise from surface scattering, while maintaining equipment and operation cost at a practical level. For deep subterranean seismic surveys, reflected seismic energy trapped under terranean surface can act as noise and occupy up to 95% measurement signal strength. The disclosed geometry for layout of sources and receivers enables reducing this noise with a substantially limited number of receivers as compared to conventional or alternative geometries.

FIG. 1 illustrates an example system 100 for collecting seismic energy generated by one or more seismic energy sources reflected from one or more geologic formations to seismic energy receivers. The illustrated system 100 may include a data acquisition and process station 107, a seismic energy source 110, and a number of horizontal seismic energy receivers 115 near a terranean surface 105. In some embodiments, the seismic energy source 110 generates excitation energy 140 towards two exemplar subterranean zones 130 and 135. A portion of the energy 140 is reflected towards the energy receivers 115 as reflection energy 145. In some instances, the subterranean zones 130 and 135 may have different physical properties, and the reflection energy 145 may include information that can be used to describe and differentiate the two zones 130 and 135.

Although the terranean surface 105 is illustrated as a surface above sea level, in some embodiments, the terranean surface 105 represents an undersea terranean surface, such as, for example, a sea floor or other surface partially or completely submerged (e.g., under salt or fresh water). Accordingly, references to the terranean surface 105, or other terranean surface, in the present disclosure encompass both above water and below water terranean surfaces.

The data acquisition and process station 107 may be any computation system that is connected to the seismic energy receivers 115, recording and/or processing data transmitted from the receivers 115. The station 107 may include a central processor, memories, storage devices, and input/output interfaces/devices. In certain instances, the station 107 may only perform storage function and interface with other systems for processing. The station 107 may be present onsite, and/or be on an external terminal communicated via a network. The station 107 may also be connected with the seismic energy source 110, enabling overall system control and/or documentation.

For example, in some embodiments, the data acquisition and process station 107 may be a server that stores one or more software applications executed via requests and responses sent to users or clients communicably coupled to the station 107, for example, through a wired and/or wireless network. At a high level, the data acquisition and process station 107 comprises an electronic computing device operable to receive, transmit, process, store, or manage data and information associated with the system 100. As used in the present disclosure, the term "computer" of "computing device" is intended to encompass any suitable processing device. For example, although FIG. 1 illustrates a single data acquisition and process station 107, system 100 can be implemented using two or more stations 107, as well as computers other than servers, including a server pool. Indeed, data acquisition and process station 107 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems.

The seismic energy source 110 may be any appropriate device that generates controlled seismic energy used to perform both reflection and refraction seismic surveys. For example, the seismic energy source 110 may be dynamite (or other explosive), an air gun, a thumper truck, a plasma sound source, a seismic vibrator, boomer sources, a combination of one or more of the preceding, and other noise sources. The seismic energy source 110 may provide single pulses or continuous sweeps of the excitation energy 140, by generating seismic waves travelling through a medium such as water or layers of rocks. The seismic energy 140 may have a useable frequency of 5 to 120 Hz. The seismic waves reflect and refract, and are recorded by the seismic receivers 115 and 125.

In FIG. 1, the seismic energy source 110 is represented by a vibration truck. The vibration truck (and/or other forms of seismic vibrators) may propagate energy signals for an extended period of time, contrasting to the near instantaneous energy provided by impulsive sources. For example, a vibrator truck may have servo-controlled hydraulic motors or electrical motors mounted on vehicle chassis and a baseplate installed below the hydraulic motors. After the vibration truck is driven to a shot point, the baseplate is lowered and the vehicle weight is applied to the baseplate. The hydraulic motors may then actuate and generate a series of vibration (e.g., a sweep) into the terranean surface 105.

In some embodiments, a thumper truck may be used as the energy source 110 and applied to FIG. 1 in a similar fashion as the vibration truck. A thumper truck may raise a heavy weight in the back and drop it from about three meters above the ground to impact the terranean surface 105 to create the excitation energy 140. In other embodiments, explosives may be used as the energy source 110, at locations covered with loose sediments, swamps, or marshes. The explosive charges may be placed between 20 to 250 feed underneath the terranean surface 105, in a hole that is drilled with dedicated equipment, such as, for example, an ARDCO C-1000 drill mounted on an ARDCO K 4×4 buggy.

In some embodiments, an air gun may be used as the energy source 110, particularly for marine surveys (e.g., for a terranean surface partially or completely submerged under water). The air gun may be constructed with pneumatic chambers that are pressurized with compressed air at 2000 to 3000 psi (14 to 21 MPa). The air gun may be submerged and towed by a mobile vessel. When the air gun is fired, a solenoid is triggered, releasing air into a fire chamber that causes a piston to move, thereby allowing the air to escape another main chamber to produce a pulse of acoustic energy, as the excitation energy 140. In some embodiments, a plasma sound source may be used as the energy source 110, particularly for marine surveys. The plasma sound source may generate low frequency sonar pulse underwater. For example, the plasma sound source may store electric charge in a large high-voltage bank of capacitors and release the stored energy in an arc across electrodes underwater, producing a high-pressure plasma and vapor bubble that expands and collapses to create a loud sound between 20 to 200 Hz. In other embodiments, a boomer sound source or other appropriate noise sources may be used as the energy source 110.

A number of horizontal seismic energy receivers 115 may be used to receive the reflected energy 145. The receivers 115 may be coupled with a string to form a web/matrix/array to cover a target area. In some embodiments, the receivers 115 may be geophones, a device that converts ground movement/displacement into electrical signals (e.g., voltage). The signals may be sent to the acquisition and processing station 107, directly via cables or indirectly via a network such as the internet (or other wired and/or wireless communication system). The deviation of the signals may be used to analyze the structure under the terranean surface 105. In some embodiments, geophones may be passive analog devices that include a spring mounted magnetic mass moving within a wire coil to generate an electrical signal via electromagnetism. This type of geophones may respond proportionally to ground movement velocity.

Geophones may also use MEMS (microelectromechanical systems) to generate an electrical response to ground motion through an active feedback circuit to maintain the position of a small silicon piece. This type of geophone may respond proportionally to movement acceleration and may have a very high noise level (e.g., 50 dB higher in velocity), therefore suitable for active seismic applications. Either type of the geophones may be used to detect ground movement up to three dimensions, with measurement in the vertical direction more often than others. The geophones may measure in large numbers, coupled together in an array by connection strings and/or cables. In FIG. 1, three geophones are illustrated connected by a string, inserted into the terranean surface 105 by a needle structure which both maintains the geophone's vertical attitude and transmits seismic waves directly to the measurement component.

In some embodiments, the horizontal receivers 115 may be accelerometers, vibrometers, optical sensors, or other measurement devices that detects the movement of the terranean surface 105. For example, accelerometers, or any vibration sensor, may transform mechanical vibration (i.e., the seismic wave) into an electrical signal. An accelerometer may behave as a damped mass on a spring: when the sensor is vibrated, the mass is displaced to the point that the spring is able to accelerate the mass at the same rate as the casing. The displacement is then measured to give the acceleration of the vibration. Some accelerometers may use piezoelectric, piezoresistive or capacitive components to convert the mechanical motion into an electrical signal. Some piezoelectric accelerometers that rely on piezoceramics (such as lead zirconate titanate) or single crystals (such as quartz, tourmaline) may have upper frequency range, low packaged weight and high temperature range. Some piezoresistive accelerometers may be used in very high shock applications. Some capacitive accelerometers may use a silicon micro-machined sensing element to achieve superior low frequency range, high stability and linearity. Some other accelerometers may be small micro electro-mechanical systems that include a cantilever beam with a proof mass for measurement.

The majority of geophones are used in reflection seismology to record the energy waves reflected by the subsurface geology. However, not all the waves are upwards travelling. A strong, horizontally transmitted wave known as ground-roll may also generate vertical motion that can obliterate the weaker vertical signals and measured by horizontal receivers such as the illustrated receivers 115. The seismic sondes may use electromagnetism, MEMS, piezoelectric, piezoresistive, and/or capacitive components to measure a largely horizontal component of the reflected seismic wave 145.

In some embodiments, the system 100 may be deployed offshore, such as being deployed at sea, with marine equipment used for the seismic energy source 110 and seismic energy receivers 115 installed at seabed or towed on sea surface. For example, instead of a vibration truck or a thumper truck, the seismic energy source 110 may be an air gun, a plasma sound source, a boomer source, or any appropriate noise sources. The seismic energy receivers 115 may be hydrophones, instead of geophones, and may be towed behind mobile vessels and maintain a substantially constant formation and distance with regard to the seismic energy source 110. In some particular embodiments, there may be no vertical seismic receivers 125 in the system 100, and the borehole 120 may be absent/non-necessary. The system 100 may be fully operational with only the seismic energy source 110, the seismic energy receiver 115, and the data acquisition and process station 107.

In FIG. 1, the seismic energy source 110 generates an excitation seismic wave 140. The excitation seismic wave 140 may be a number of single pulses, and/or a number of sweeps (i.e., a frequency profile as a function of time sustained for noticeable durations.). The seismic wave 140 may have a useable frequency between 5 to 120 Hz. The duration or a sweep may be 5 to 30 seconds. The seismic wave 140 may travel through the earth's crust and be reflected back to the terranean surface 105. A simplified illustration of the earth's crust, as depicted in FIG. 1, shows various subterranean zones such as the layer 130 and the layer 135. The layers 130 and 135 may be composed of a great variety of igneous, metamorphic, and sedimentary rocks, and therefore have different physical properties in reflecting the seismic wave 140. The reflection seismic wave 145 may carry energy signals in different phases and magnitudes of the layers 130 and 135. For example, the layers 130 and 135 are of different depth and therefore the energy reflected by the layer 135 may take longer to reach the receivers 115. However, since the energy travels a longer distance, the damping effect of different rock materials may reduce the magnitude of the energy reflected off the layer 135. Other physical properties rather than travel velocity and damping ratio, carried by the reflection seismic wave 145, may also be used to identify the shape and composition of the layers 130 and 135. The reflection seismic wave 145 therefore enables the use of seismology to identify the properties of subterranean geology.

In some embodiments, both reflection and refraction of the seismic energy may be measured. Seismic reflection profiling may involve the measurement of the two-way travel time of seismic waves 140 and 145 transmitted from the terranean surface 105 and reflected back to the surface 105 at the interfaces between contrasting geological layers 130 and 135. Reflection of the transmitted energy will only occur when there is a contrast in the acoustic impedance (product of the seismic velocity and density) between these layers. The strength of the contrast in the acoustic impedance of the two layers 130 and 135 determines the amplitude of the reflected seismic wave 145. In a seismic refraction method, measurement is based on the travel time of seismic waves refracted at the interfaces between subsurface layers of different velocity.

The seismic energy receivers 115 and 125 may receive other energy signals, such as ambient noises, besides the reflection seismic wave 145. For example, ambient noise may be caused by surface scattering, surface traffic, wind, surface and air waves, and subsurface reflections that are not direct/primary reflections from a subsurface rock layer. For an ideal measurement, high signal to noise ratio is desired. This may be achieved by certain arrangements of the seismic energy source 110 and the seismic energy receivers 115 and 125.

Figure 2A:
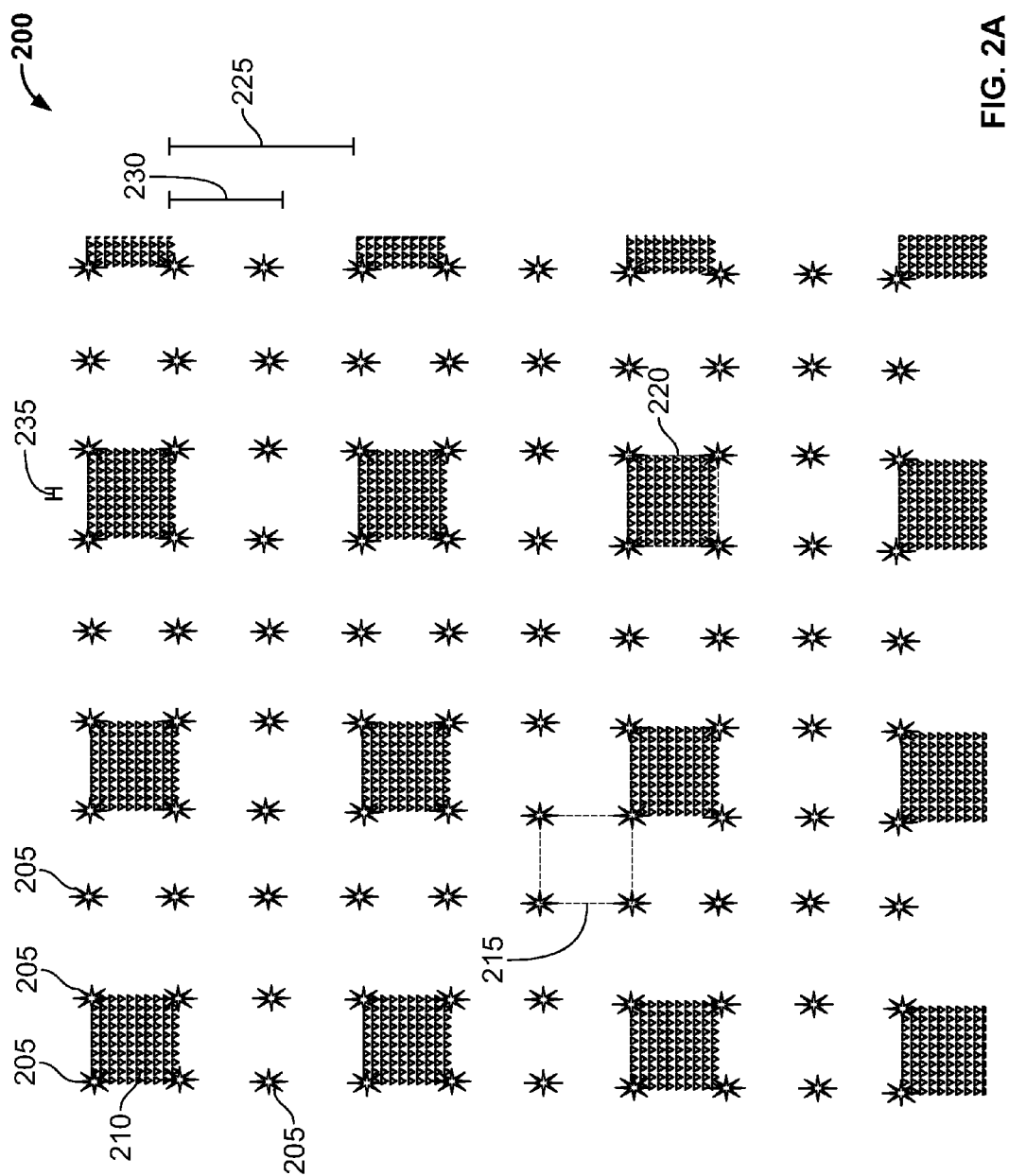
FIGS. 2A-2D illustrate plan views of example designs of seismic energy collection systems having a plurality of seismic energy sources and a plurality of seismic energy receivers arranged in an array.

FIGS. 2A-2D illustrate plan views of example designs of seismic energy collection systems having a plurality of seismic energy sources and a plurality of seismic energy receivers arranged in an array. Turning to FIG. 2A, for example, a seismic energy collection system 200 having a plurality of seismic energy sources 205 and a plurality of seismic energy receivers 210 arranged in an array on the earth's surface or buried below the marked locations is illustrated. In this particular example, both the seismic energy sources 205 and the seismic energy receivers 210 are positioned in a square array, which is formed with equal number of columns and rows equally spaced apart. For example, the seismic energy sources 205 form a two by two sparsely packed geographic zone 215, which is the unit formation for the overall array. The overall array may be formed by a plurality of the sparsely packed geographical zones 215 in equal number of rows and columns. For example, the width of each row and column may be 300 meters, which is also the orthogonal distance between every two adjacent seismic energy sources 205. This orthogonal distance is the seismic energy source offset 230. Although the seismic energy source offset 230 is illustrated to be 300 meters, it may be of any number suitable for seismic survey.

In each of the sparsely packed geographic zone 215, there may be an absence of any seismic energy receivers, as described in FIG. 1. For example, the illustrated seismic energy collection system 200 has no seismic energy receivers located in the sparsely packed geographic zones 215. However, in some embodiments, there may be one or more seismic energy receivers located in each sparsely packed geographic zone 215. In the event of a sparsely packed geographic zone 215 having one or more seismic energy receivers, the receivers may only be placed at less than two receivers per wavelength of seismic waves in each sparsely packed geographic zone 215.

Interspersed among the sparsely packed geographic zones 215 are densely packed geographic zones 220. For example, one densely packed geographic zone 220 may be placed within a three by three sparsely packed geographic zone 215 array, for example, in the first row and first column of the three by three array. However, there may be more than one densely packed geographic zone 220 in the three by three array, such as two to up to nine densely packed geographic zones 220, if, for example, cost permits. The distance between the densely packed geographic zones 220 is the zone offset 225, which is 600 meters as illustrated in FIG. 2A.

In each of the densely packed geographic zones 220, there may be an array of seismic energy receivers placed at an equal orthogonal distance, such as 20 meters. This orthogonal distance is the seismic energy receiver offset 235. Although the seismic energy receiver offset 235 is illustrated to be 20 meters, resulting in a fifteen by fifteen array, it may be of any number for a denser, higher cost survey, or a sparser, more efficient survey, so far as the seismic energy receiver offset 235 satisfied non-aliasing conditions for target seismic wave measurement (i.e., at least two receivers per wavelength). This criterion is a derivation of the least signal sampling requirement by Nyquist criterion: sampling interval needs to be smaller than half of the highest object wavelength to avoid aliasing, which is an effect that causes different signals to become indistinguishable when sampled. Aliasing may also refer to the distortion and/or artifact that result when the signal reconstructed from samples is different from the original continuous signal.

In some embodiments, the noise cancellation process may use at least one multi-channel filter (such as an FK filter, slant stack, or radon filter) to remove horizontally travelling noise (surface waves) in the surface layer. The filter, for example, may be applied in a 2D mode over the 2D array. The multi-channel filter may include energy normalization of signal strength at each receiver.

In some embodiments, the seismic energy collection system 200 may be in a different layout other than a square array, so far as one densely packed zone can be adjacent to at least one sparsely packed zone. For example, the seismic energy sources and receivers may be in a rectangular, circular, hexagonal, triangular, or elliptical layout.

Figure 2B:
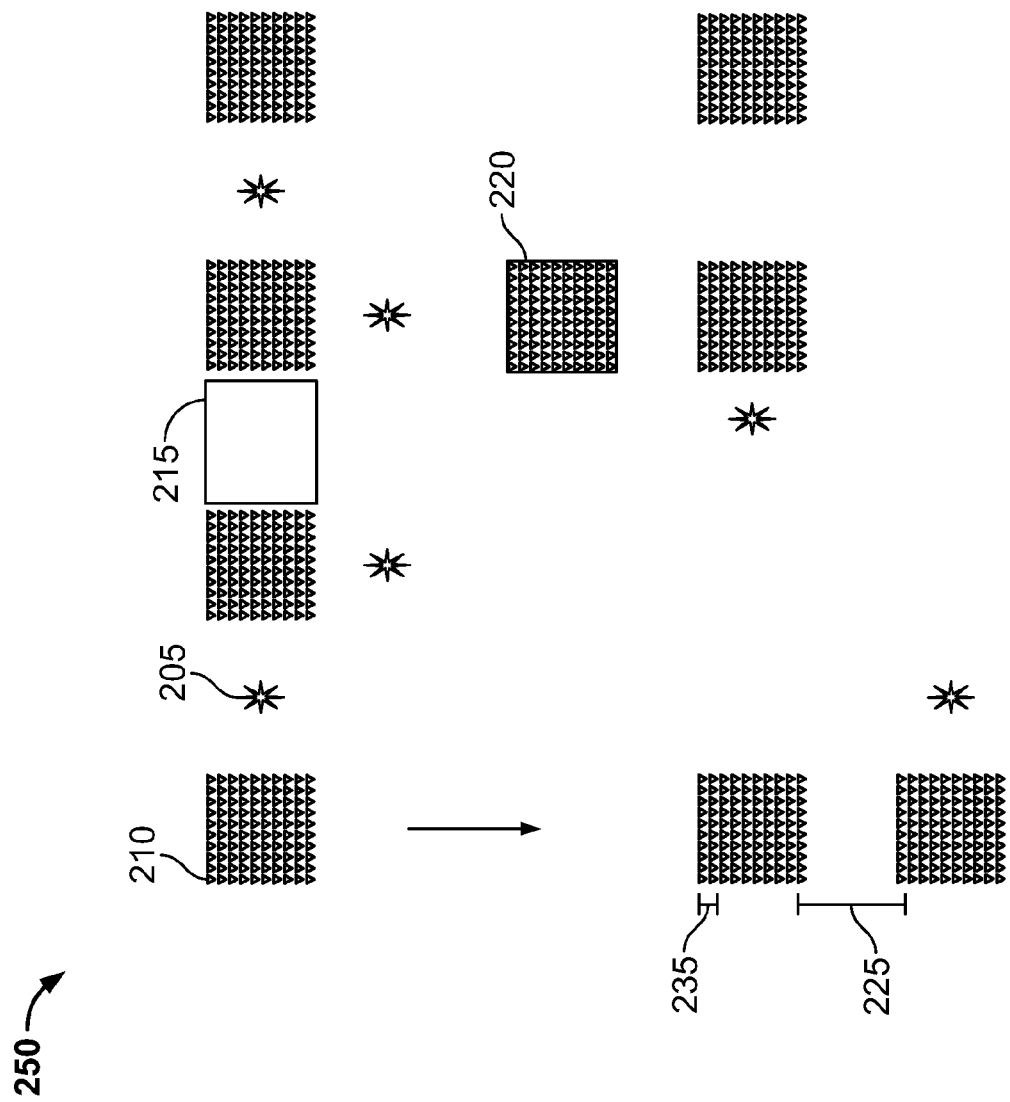

Turning to FIG. 2B, for instance, another example seismic energy collection system 250 is illustrated. Like system 200, the system 250 includes a plurality of seismic energy sources 205 and a plurality of seismic energy receivers 210 arranged in an array on the earth's surface or buried below the marked locations. In this particular example of FIG. 2B, only the seismic energy receivers 210 are positioned in a square array, which is formed with equal number of columns and rows equally spaced apart, while the seismic energy sources 205 are randomly positioned among the array of receivers 210. The overall array may be formed by a plurality of the sparsely packed geographical zones 215 in equal (or unequal in some embodiments) number of rows and columns.

In each of the sparsely packed geographic zone 215, there may be an absence of any seismic energy receivers, as described in FIG. 1. For example, the illustrated seismic energy collection system 250 has no seismic energy receivers located in the sparsely packed geographic zones 215. However, in some embodiments of system 250, there may be one or more seismic energy receivers located in each sparsely packed geographic zone 215. In the event of a sparsely packed geographic zone 215 having one or more seismic energy receivers, the receivers may only be placed at less than two receivers per wavelength of seismic waves in each sparsely packed geographic zone 215.

Interspersed among the sparsely packed geographic zones 215 are densely packed geographic zones 220. For example, one densely packed geographic zone 220 may be placed within a three by three sparsely packed geographic zone 215 array, for example, in the first row and first column of the three by three array. However, there may be more than one densely packed geographic zone 220 in the three by three array, such as two to up to nine densely packed geographic zones 220, if, for example, cost permits. The distance between the densely packed geographic zones 220 is the zone offset 225, which is 600 meters as illustrated in FIG. 2A.

In each of the densely packed geographic zones 220, there may be an array of seismic energy receivers placed at an equal orthogonal distance, such as 20 meters. This orthogonal distance is the seismic energy receiver offset 235. Although the seismic energy receiver offset 235 is illustrated to be 20 meters, resulting in a fifteen by fifteen array, it may be of any number for a denser, higher cost survey, or a sparser, more efficient survey, so far as the seismic energy receiver offset 235 satisfied non-aliasing conditions for target seismic wave measurement (i.e., at least two receivers per wavelength). This criterion is a derivation of the least signal sampling requirement by Nyquist criterion: sampling interval needs to be smaller than half of the highest object wavelength to avoid aliasing, which is an effect that causes different signals to become indistinguishable when sampled. Aliasing may also refer to the distortion and/or artifact that result when the signal reconstructed from samples is different from the original continuous signal.

As illustrated in FIG. 2B, the seismic energy sources 205 may be randomly (or non-uniformly) dispersed within the overall array of seismic energy receivers 210. Thus, there may be no correlation between the respective locations of the seismic energy sources 205, sparsely packed geographic zones 215, and/or densely packed geographic zones 220, provided that at least one seismic energy source 205 is positioned within the overall array of system 250.

Figure 2C:
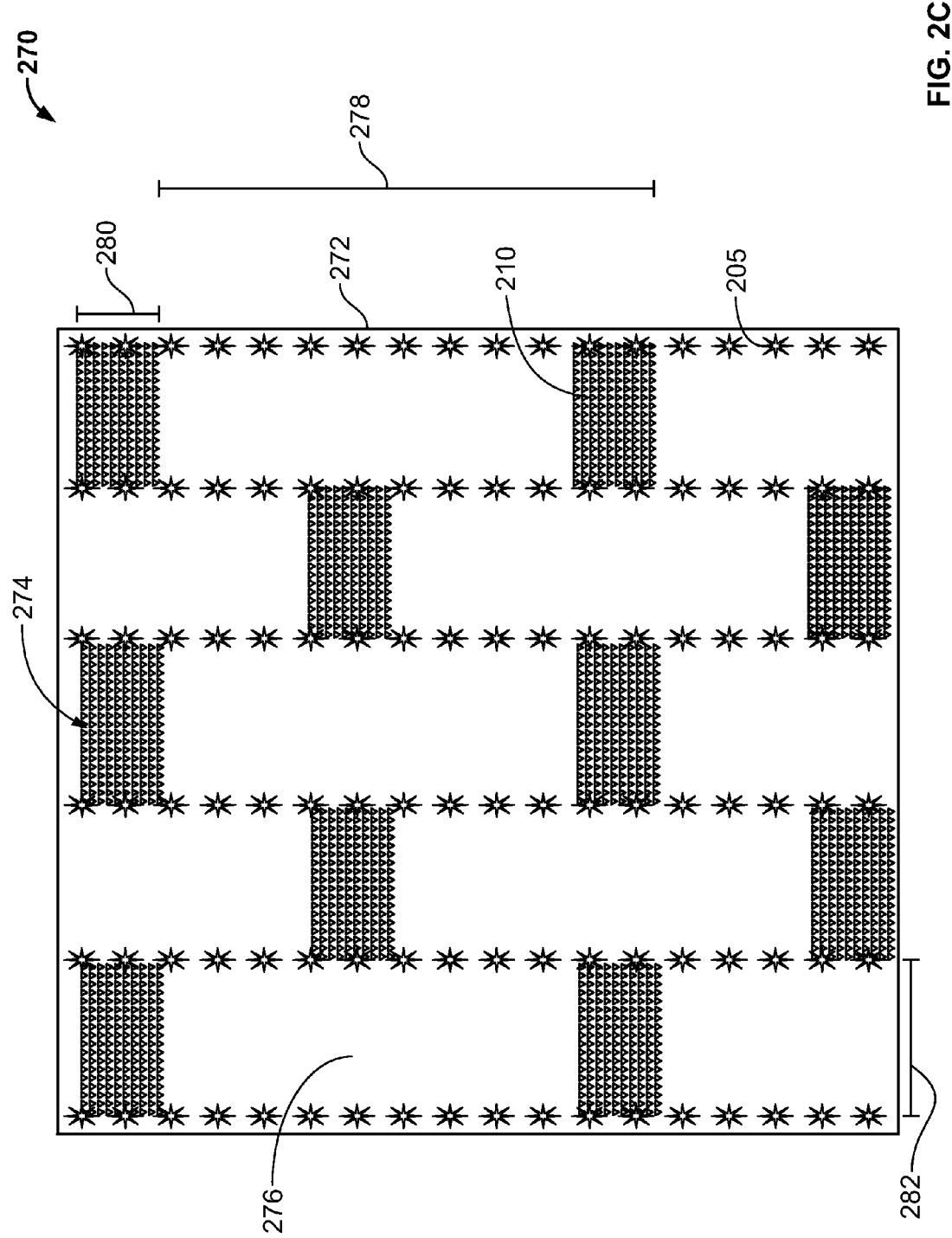

Turning to FIG. 2C, another example seismic energy collection system 270 is illustrated. Like system 200, the system 270 includes a plurality of seismic energy sources 205 and a plurality of seismic energy receivers 210 arranged on the earth's surface or buried below the marked locations. In this particular example of FIG. 2C, the seismic energy sources 205 are installed in substantially equidistant rows within a seismic survey area 272 that defines an area on the terranean surface in which the sources 205 and receivers 210 are installed. Although illustrated as equidistant-spaced rows of seismic energy sources 205, some rows may be closer together as compared to other rows, and the rows may not be straight but instead may vary in direction in the seismic survey area 272. Further, although illustrated as spanning all or most of a dimension of the seismic survey area 272, one or more rows of the seismic energy sources 205 may only extend a partial distance of a dimension of the survey area 272.

As illustrated, the seismic energy receivers 210 are grouped in square arrays 274 between the rows of the seismic energy sources 205. In some embodiments, one or more of the square arrays 274 are densely-packed arrays of seismic energy receivers 205 having, for example, two or more seismic signal receivers 210 per wave length of seismic energy generated by at least one of the installed seismic energy sources 205. In another example, one or more of the square arrays 272 are composed of receivers 210 such that a distance between individual receivers 210 within the array 274 is less than half of the wavelength of noise generated by seismic energy output by the seismic energy sources 205 (e.g., velocity of the noise divided by a maximum frequency of interest).

One or more of the square arrays 274 may span a dimension 280 that defines one side of the array 274. In the illustrated embodiment, the dimension 280 may be about 300 meter; alternatively, other distances for dimension 280 may be used (e.g., depending on frequency of interest, terrain, cost considerations, type of seismic energy source or receiver, and otherwise). For example, in some embodiments, the size of the square arrays 274 may be about five times half of the wavelength of the noise generated by seismic energy output by the seismic energy sources 205 (e.g., velocity of the noise divided by a maximum frequency of interest). Further, although illustrated as square arrays, one or more arrays 274 may be any other shape (e.g., circular, hexagonal, triangular, or otherwise) or even a random collection of seismic energy receivers 210 grouped in an arbitrary, densely-packed collection (e.g., as shown in FIG. 2D).

Each array 274 of seismic energy receivers 210 is positioned adjacent one or more sparsely-packed areas 276 within the seismic survey area 272. As illustrated, the sparsely-packed areas 276 are defined between the rows of seismic energy sources 205 and also between the square arrays 274 positioned in the seismic survey area 272. In some embodiments, one or more of the sparsely-packed areas 276 may have less than two seismic energy receivers 210, including zero seismic energy receivers 210, installed at the terranean surface within the particular sparsely-packed area 276.

As illustrated, the rows of seismic energy sources 205 may be separated by a dimension 282. In some embodiments, the dimension 282 may be about 640 meters. Further, as illustrated, a dimension 278 may define a distance between corresponding edges of two adjacent arrays 274. For example, as shown, the dimension 278 may span a dimension of a particular sparsely-packed area 276 plus the dimension 280. In some embodiments, the dimension 278 may be about 1800 meters; alternatively other distances for dimension 278 are possible. For example, the dimension 278 may be roughly six times the dimension 280, such that a dimension of the sparsely-packed array 276 is five times the dimension 280.

Figure 2D:
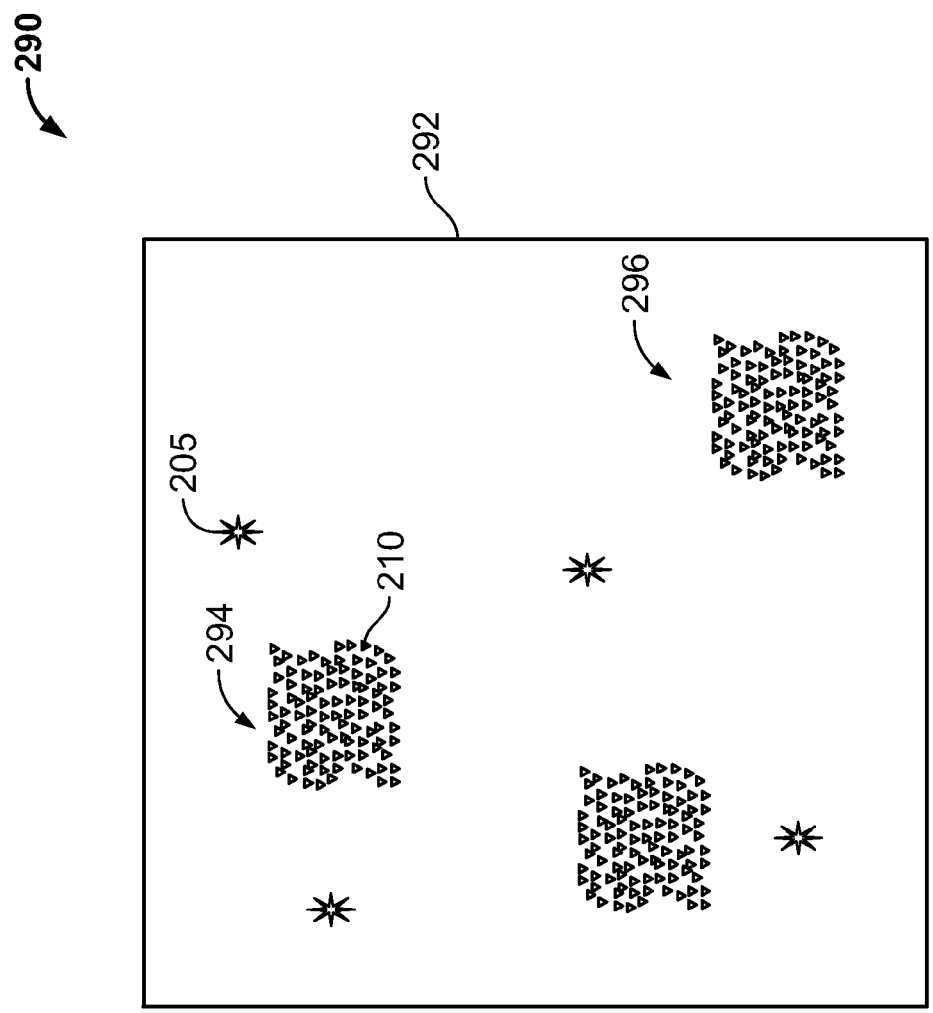

Turning to FIG. 2D, another example seismic energy collection system 290 is illustrated. The system 290 includes a plurality of (e.g., two or more) seismic energy sources 205 and a plurality of seismic energy receivers 210 arranged on the earth's surface or buried below the marked locations. In this particular example of FIG. 2D, the seismic energy sources 205 may installed randomly or at arbitrary locations within a seismic survey area 292 that defines an area on the terranean surface in which the sources 205 and receivers 210 are installed.

As illustrated, the seismic energy receivers 210 are grouped in arrays 294 within the seismic survey area 292. The illustrated arrays 294 are composed of arbitrarily-placed seismic energy receivers 210 in densely-packed groups. For example, one or more of the arrays 294 may have two or more seismic signal receivers 210 per wave length of seismic energy generated by at least one of the installed seismic energy sources 205. In another example, one or more of the arrays 294 are composed of receivers 210 such that a distance between individual receivers 210 within the array 294 is less than half of the wavelength of noise generated by seismic energy output by the seismic energy sources 205 (e.g., velocity of the noise divided by a maximum frequency of interest). In some embodiments, one or more of the arrays 294 may be composed of a shaped array (e.g., a square array) rather than an arbitrarily-placed group of receivers 210.

Each array 294 of seismic energy receivers 210 is positioned adjacent one or more sparsely-packed areas 296 within the seismic survey area 292. As illustrated, the sparsely-packed areas 296 may be a large, contiguous area defined within the seismic survey area 292. Alternatively, the sparsely-packed areas 296 may be defined as separate sub-areas within the seismic survey area 292. In some embodiments, one or more of the sparsely-packed areas 292 may have less than two seismic energy receivers 210, including zero seismic energy receivers 210, installed at the terranean surface within the particular sparsely-packed area 292.

Figure 3:
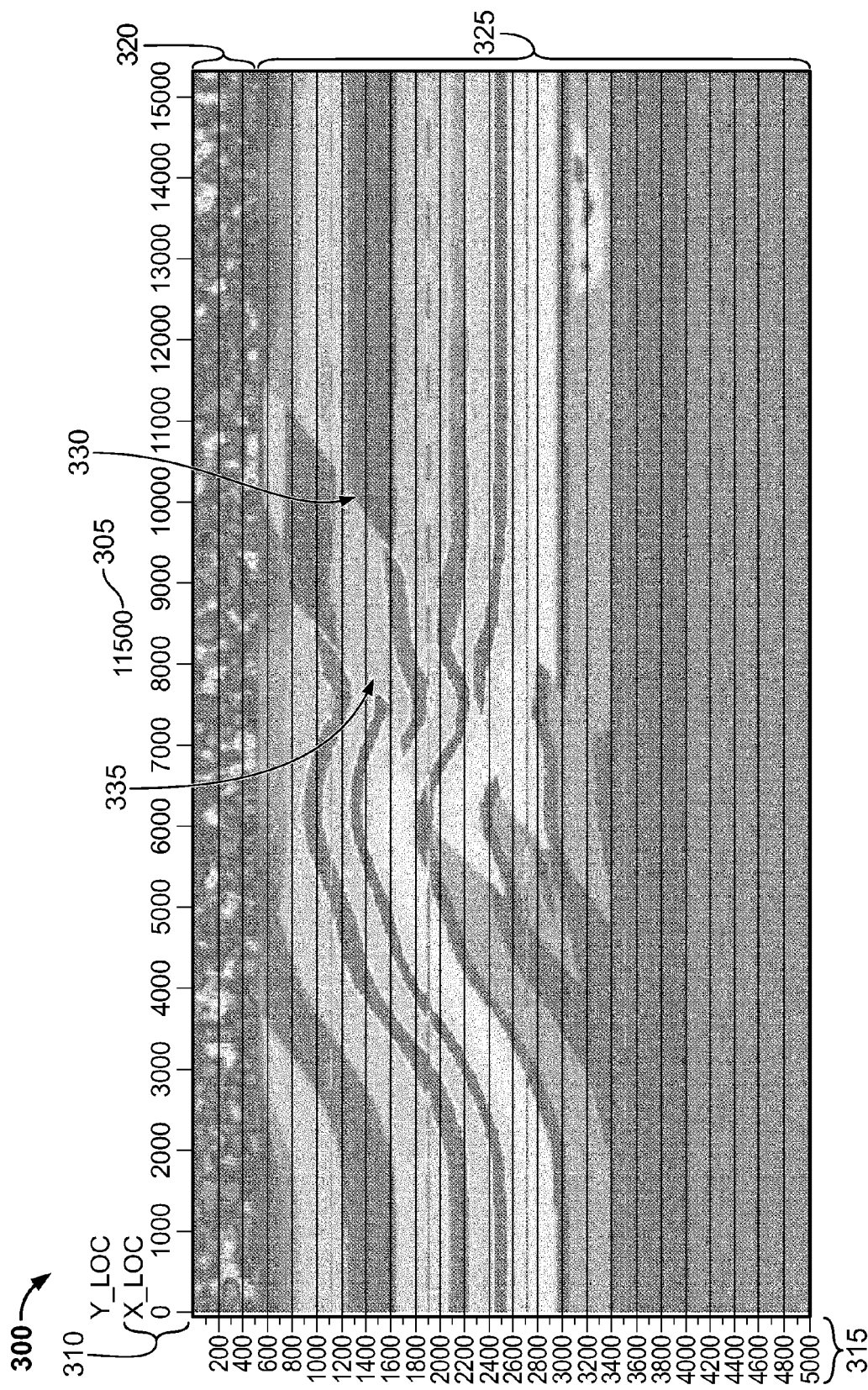
FIG. 3 illustrates an imagery model showing one or more actual geologic formations located under a terranean surface.

FIG. 3 illustrates an imagery model 300 showing one or more actual geologic formations located under a terranean surface. The imagery model 300 is a two dimensional representation of a cross section, at a y location 305 of 11,500 feet. The cross section may represent the actual geological formation at one of the densely packed zones 220 in FIG. 2A. The y location 305 is measured along a first axis (e.g., along the width of the square) extending coincident with the perimeter of one of the densely packed zone 220 as shown in FIG. 2A. The x location 310 is measured along a second axis perpendicular to the y axis and in the planar surface parallel to the terranean surface 105. The imagery model 300 shows a cross section spanning from 0 to 15,000 feet across the x axis, such as from one side of the densely packed zone 220 square to the other side. The z location 315 is the depth dimension, from the terranean surface 105 (indexed at 0 feet) to 5000 feet. The imagery model 300 is rendered with false color to show variations in subterranean layer properties, which may be layer density, hardness, temperature, chemical composition, and/or any other physical/mechanical characteristics.

An upper layer containing random noise distribution as indicated by the false color shows a surface layer 320, which may be a composition of various rocks formed by random movement and deposition (e.g., forced by flow such as wind and water). This surface layer 320 has a certain thickness and is not meant to be measured with seismic energy survey. However, as the seismic waves propagate and reflect, the surface layer 320 can bounce seismic energy and cause noise for the seismic energy receivers 115. In some embodiments, the noise caused by reflection at the surface layer 320 may constitute 90-95% of signal strength in deep subterranean seismic measurements. This noise can be removed using post processing techniques if the seismic energy receivers 115 are placed properly as illustrated in the densely packed zones 220 in FIG. 2A. The other portion of the content under the surface layer 320 is the under surface layer 325. The under surface layer 325 contains more useful information for determining subterranean formations.

In FIG. 3, the under surface layer 325 is composed of stacks of multiple false colored layers and some important geological features. For example, two major discontinuities can be observed in the under surface layer 325: the geologic formations 330 and 335. The geologic formations 330 and 335 are cracks in the Earth's crust. The geologic formations 330 and 335 may be one of two types of geological faults: normal dip-slip fault, and reverse dip-slip fault. A third type, a strike-slip fault, may be measured in a different view. Other geological formations may be measured, such as formations that trap hydrocarbon deposits.

Figure 4:
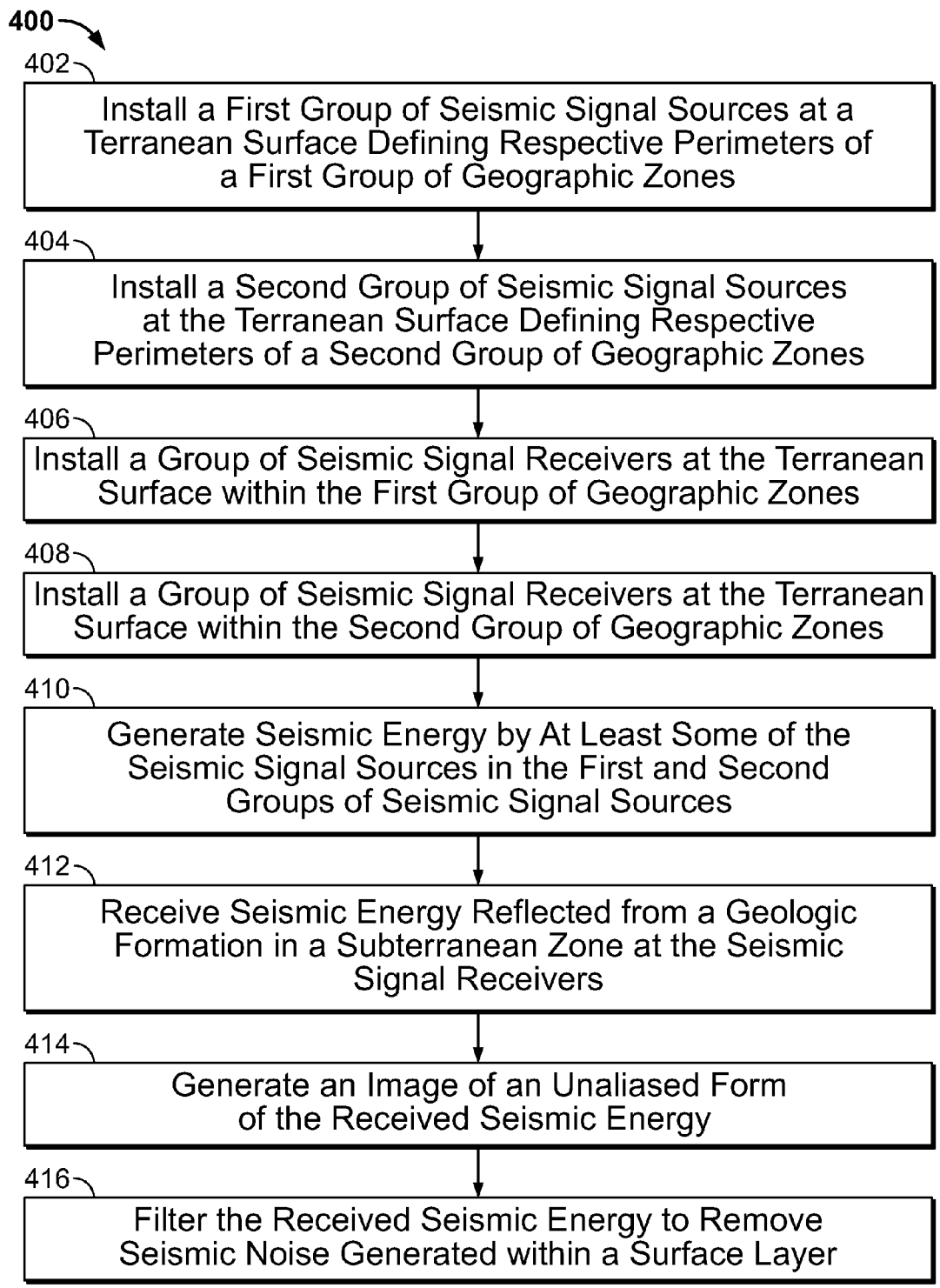
FIG. 4 illustrates a flowchart describing an example method for managing a seismic energy collection system.

FIG. 4 illustrates a flowchart describing an example method 400 for managing a seismic energy collection system.

At step 402, a first group of seismic energy sources are installed at a terranean surface, defining respective perimeters of a first number of geographic zones. For example, the first group of seismic energy sources may be placed in certain geometrical layout, such as a square array similar to the sparsely packed zones 215.

At step 404, a second group of seismic energy sources are installed at the terranean surface, defining respective perimeters of a second group of geographic zones. For example, the second group of seismic energy sources may be placed in a certain geometrical layout, such as a square array similar to the densely packed zones 220.

At step 406, a group of seismic signal receivers are installed at the terranean surface within the first group of geographic zones. For example, the first group of seismic energy sources may be placed in a certain geometrical layout, such as a square array similar to the sparsely packed zones 215. The first group of geographic zones can have receivers spaced such that, for example, there are less than two seismic signal receivers per wave length of seismic energy generated by at least one of the installed seismic energy sources.

At step 408, a group of seismic signal receivers are installed at the terranean surface within the second group of geographic zones. The group of seismic energy sources within the second group of geographic zones may be placed in a certain geometrical layout, such as a square array similar to the densely packed zones 220 where there may be a densely packed array of seismic energy receivers as described in FIG. 2A. For example, the second group of geographic zones can have receivers spaced such that, for example, there are two or more seismic signal receivers per wave length of seismic energy generated by at least one of the installed seismic energy sources.

In some aspects of the method 400, steps 406 and 408 may be performed such that there are a greater number of seismic energy receivers installed within the second group of geographic zones relative to the first group of geographic zones. For instance, there may be a half or a quarter of a number of seismic energy receivers installed within the first group of geographic zones relative to a number of seismic energy receivers installed within the second group of geographic zones. Indeed, in some aspects, step 406 may be largely (or completely) eliminated, resulting in the first group of geographic zones being substantially free of any installed seismic signal receivers. Thus, the step (406) of installing a group of seismic signal receivers at the terranean surface within the first group of geographic zones may be understood as installing no seismic energy receivers within the first group of geographic zones.

In some aspects of method 400, the first and second groups of geographic zones may be adjacent, such as, for example, in a checkerboard pattern. But as shown in FIG. 2A, for instance, there may be multiple zones of the first group of geographic zones (e.g., geographic zones 215) in between two zones of the second group of geographic zones (e.g., geographic zones 220). But there may be more than two zones of the first group of geographic zones in between two zones of the second group of geographic zones in some aspects.

At step 410, at least some of the first and the second number of seismic energy sources generate seismic energy into the terranean surface. The generated seismic energy waves travel into ground and are bounced back by different subterranean formations. For example, the seismic energy sources can be any appropriate device that generates controlled seismic energy used to perform both reflection and refraction seismic surveys, such as a dynamite (or other explosive), an air gun, a thumper truck, a plasma sound source, a seismic vibrator, boomer sources, a combination of one or more of the preceding, and other noise sources.

At step 412, the seismic signal receivers receive the seismic energy reflected from a geologic formation in a subterranean zone. For example, the seismic energy receivers can be any appropriate device that receives seismic energy and produce signals, such as geophones, hydrophones, sondes in a wellbore, and/or a combination thereof.

At step 414, the collected signal data is processed to generate an image of an non-aliased form of the received seismic energy. For example, the signal data may be collected by the data acquisition and process station 107 as described in FIG. 1. The data acquisition and process station may be any computation system that is connected to the seismic energy receivers, recording and/or processing data transmitted from the receivers. In some embodiments, the data acquisition and process station may be a server that stores one or more software applications executed via requests and responses sent to users or clients communicably coupled to the station 107, for example, through a wired and/or wireless network. The data acquisition and process station 107 may process the received seismic wave signal and generate an image of an unaliased form of the seismic energy. Therefore, this step may include generating seismic energy by at least some of the seismic signal sources, receiving the generated seismic energy reflected from a geologic formation in a subterranean zone in a number of seismic signal receivers, and generating an image of an unaliased form of the received seismic energy.

For example, an image model may be generated representing one or more actual geologic formations located under a terranean surface (e.g., as shown in FIG. 3) through receipt of seismic energy at seismic energy receivers of a seismic energy collection system. The model may be is a two dimensional representation of a cross section, at a y location measured along a first axis (e.g., along the width of a geographic zone, and an x location measured along a second axis perpendicular to the y axis and in the planar surface parallel to a terranean surface. A z location may be a depth dimension from the terranean surface. Of course, as described above, the terranean surface may, in some embodiments, be a subsea surface, which could be several hundred feet (if not more) below sea level.

The generated model may show an upper, surface layer with limited signal. An under surface layer of the generated model is composed of informative geological features exposed through the receipt of seismic energy. The generated model may show, for example, discontinuities observed in the under surface layer, such as the geologic formations, geologic strata, geologic faults and other formations. In some aspects, the generated model may show such features with a reduced or insignificant noise component, due to, for example, signal processing of seismic energy data received by the seismic receivers.

At step 416, the received seismic energy is filtered to remove seismic noise generated within a surface layer, such as the terranean surface 320. For example, the process may include multi-channel filtering (such as an FK-filter, slant stack, or radon filter) and the filter may be one or two dimensional. A manual gain function may be used to adjust signal strength. Subsequent filters may be used for further reducing surface waves.

A number of implementations have been described. Nevertheless, it will be understood that various modifications may be made. Further, method 400 may include fewer steps than those illustrated or more steps than those illustrated. In addition, the illustrated steps of method 400 may be performed in the respective orders illustrated or in different orders than that illustrated. Other variations in the order of steps are also possible. Accordingly, other implementations are within the scope of the following claims.

What is claimed is:

1. A system for receiving seismic signals, comprising:
a first plurality of seismic signal sources installed at a terranean surface grouped to define respective perimeters of a first plurality of geographic zones on the terranean surface;
a second plurality of seismic signal sources installed at the terranean surface grouped to define respective perimeters of a second plurality of geographic zones on the terranean surface, the second plurality of zones interspersed between the first plurality of zones to form a pattern of first and second zones, each geographic zone of the second plurality of geographic zones adjacent a geographic zone of the first plurality of geographic zones along all sides of the perimeter; and
a plurality of seismic signal receivers installed at the terranean surface, with at least one seismic signal receiver installed within each of the first and second plurality of geographic zones, the installed seismic signal receivers within the first plurality of geographic zones are less than the installed seismic signal receivers within the second plurality of geographic zones,
wherein installed seismic signal receivers within the first plurality of geographic zones comprise less than two seismic signal receivers per wavelength of seismic energy generated by at least one of the seismic signal sources, and installed seismic signal receivers within the second plurality of geographic zones comprise two or more seismic signal receivers per wavelength of seismic energy generated by at least one of the seismic signal sources, the seismic signal receivers within each of the second plurality of geographic zones arranged in a two-dimensional array dispersed substantially evenly throughout areas bounded by the perimeters defined by the second plurality of seismic signal sources.

2. The system of claim 1, wherein the installed seismic signal receivers within the first plurality of geographic zones are fewer than half of the installed seismic signal receivers within the second plurality of geographic zones.

3. The system of claim 1, wherein the first plurality of geographic zones are substantially free of seismic signal receivers.

4. The system of claim 1, wherein the plurality of the installed seismic signal receivers within the second plurality of geographic zones comprise an array of seismic signal receivers spaced substantially uniformly within respective geographic zones of the second plurality of geographic zones.

5. The system of claim 1, wherein each geographic zone in the first and second plurality of geographic zones is of substantially the same area.

6. The system of claim 1, wherein the perimeters of the first and second plurality of geographic zones are substantially square.

7. The system of claim 1, wherein a group of seismic signal sources in the second plurality of seismic signal sources comprises four seismic signal sources, and each of the four seismic signal sources is spaced at least approximately 300 meters from the other of the four seismic signal sources in the group.

8. The system of claim 1, wherein the groups of seismic signal sources in the second plurality of seismic signal sources comprise a first group and a second group, the respective geographic zones defined by the first and second groups of seismic signal sources in the second plurality of seismic signal sources are separated by at least one of the geographic zones of the plurality of first geographic zones.

9. The system of claim 1, wherein the installed seismic signal receivers within the second plurality of geographic zones comprise approximately 225 seismic signal receivers, and each of the 225 seismic signal receivers is spaced at least approximately 20 meters from the other seismic signal receivers in the group.

10. The system of claim 1, wherein the terranean surface comprises a subsea terranean surface.

11. A method for receiving seismic signals, comprising:
installing a first plurality of seismic signal sources at a terranean surface grouped to define respective perimeters of a first plurality of geographic zones on the terranean surface;
installing a second plurality of seismic signal sources at the terranean surface grouped to define respective perimeters of a second plurality of geographic zones on the terranean surface, zones the second plurality of zones interspersed between the first plurality of zones to form a pattern of first and second zones, each geographic zone of the second plurality of geographic zones adjacent a geographic zone of the first plurality of geographic zones on all sides of the perimeter; and
installing a plurality of seismic signal receivers at the terranean surface, with at least one seismic signal receiver installed within each of the first and second plurality of geographic zones, the installed seismic signal receivers within the first plurality of geographic zones are less than the installed seismic signal receivers within the second plurality of geographic zones,
wherein the installed seismic signal receivers within the first plurality of geographic zones comprise less than two seismic signal receivers per wavelength of seismic energy generated by at least one of the seismic signal sources, and wherein the installed seismic signal receivers within the second plurality of geographic zones comprise two or more seismic signal receivers per wavelength of seismic energy generated by at least one of the seismic signal sources, the seismic signal receivers within each of the second plurality of geographic zones arranged in a two-dimensional array dispersed substantially evenly throughout areas bounded by the perimeters defined by the second plurality of seismic signal sources.

12. The method of claim 11, wherein the installed seismic signal receivers within the first plurality of geographic zones are fewer than half of the installed seismic signal receivers within the second plurality of geographic zones.

13. The method of claim 11, wherein installing a plurality of seismic signal receivers at the terranean surface within the first plurality of geographic zones comprises installing no seismic signal receivers within the first plurality of geographic zones.

14. The method of claim 11, further comprising spacing the installed seismic signal receivers substantially uniformly within respective geographic zones of the second plurality of geographic zones.

15. The method of claim 11, wherein installing a second plurality of seismic signal sources at the terranean surface comprises installing a group of four seismic signal sources at corners of a particular geographic zone of the second plurality of geographic zones, the particular geographic zone of the second plurality of geographic zones comprising a substantially square area.

16. The method of claim 15, further comprising:
installing a group of two seismic signal sources adjacent a corresponding two of the four seismic signal sources to form a particular geographic zone of the first plurality of geographic zones adjacent the particular geographic zone of the second plurality of geographic zones, the particular geographic zone of the first plurality of geographic zones comprising a substantially square area that shares a perimeter portion with the particular geographic zone of the second plurality of geographic zones.

17. The method of claim 11, further comprising:
generating seismic energy by at least some of the seismic signal sources in the first and second plurality of seismic signal sources;
receiving, at the installed seismic signal receivers within the second plurality of geographic zones, the generated seismic energy reflected from a geologic formation in a subterranean zone; and
generating an image of an unaliased form of the received seismic energy.

18. The method of claim 17, wherein generating an image of an unaliased form of the received seismic energy comprises:
generating a three-dimensional image of an unaliased form of the received seismic energy, the three dimensions comprising a depth below the terranean surface, a first axis across a particular geographic zone of the second plurality of geographic zones, and a second axis across the particular geographic zone of the second plurality of geographic zones that is substantially orthogonal to the first axis.

19. The method of claim 17, further comprising:
filtering the received seismic energy to remove seismic noise generated within a surface layer.

* * * * *